June 10, 1930.  E. F. MAAS  1,763,591
FABRIC SHAPING DEVICE
Filed Dec. 4, 1925   2 Sheets-Sheet 1

Inventor
Elov F. Maas,
O. E. Bee.
Attorney

June 10, 1930.  E. F. MAAS  1,763,591
FABRIC SHAPING DEVICE
Filed Dec. 4, 1925  2 Sheets-Sheet 2
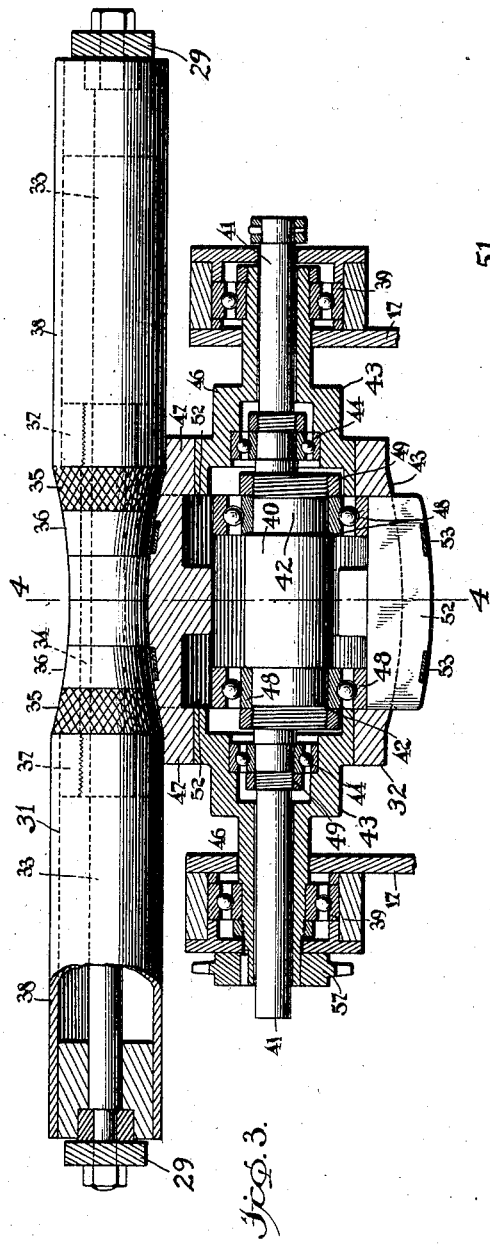
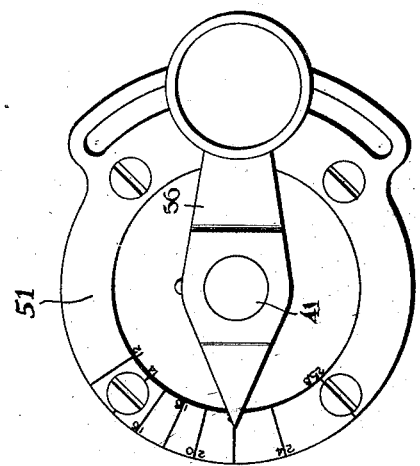
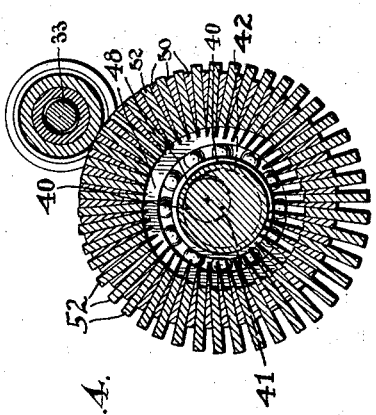
Inventor
Elov F. Maas,
By
O.E.Bee.
Attorney Patented June 10, 1930

1,763,591

UNITED STATES PATENT OFFICE

ELOV F. MAAS, OF AKRON, OHIO, ASSIGNOR TO THE GOODYEAR TIRE & RUBBER COMPANY, OF AKRON, OHIO, A CORPORATION OF OHIO

FABRIC-SHAPING DEVICE

Application filed December 4, 1925. Serial No. 73,222.

My invention relates to tire building machines and it has particular relation to that portion of the machine which is adapted to shape the plies of fabric which are utilized in pneumatic tires.

One object of my invention is to provide a device enabling an operator to control the degree of strain to which the fabric is subjected before being applied to a core of a tire building machine.

Another object of my invention is to provide a shaping device in which the strain exerted upon the fabric is positively controlled.

A further object of my invention is to provide a device by means of which the ply shaping and subsequent stitching operations which are incident to the fabrication of a tire are facilitated.

In building tires upon a core, or mandrel, a plurality of plies are superimposed and shaped about a form which is of substantially the same contour as that which the tire will assume after it is vulcanized. After the fabric reinforcing material has been positioned, the beads are set and the tread portion applied before the article is removed from the core.

In order to facilitate the stitching operations, it is not uncommon to pass the fabric through some device which is adapted to change the shape of the band or ply from a flat strip to one having a distinctly arcuate contour. For the most part, the means which have been devised to accomplish this step have consisted of a rounded brake-controlled pulley about which the fabric is made to pass. When employing these devices, the amount of strain produced depends upon the tension applied to the band as it passes around the shaping pulley.

According to this invention, a cam or an eccentrically formed shaft is provided that has a plurality of engaging elements in engagement therewith. The fabric comes into contact with the elements when their apparent radius is a minimum. As the elements move radially outwardly due to the eccentric action of the shaft, a strain is produced which is proportional to the movement of the elements, or, in other words, the strain is progressively increased. By adjusting the position of the eccentric, it is possible to control exactly the strain produced.

A better understanding of my invention may be had by referring to the drawings, in which;

Fig. 3 is a cross-sectional view of the shaping drum of the device shown in Fig. 1;

Fig. 4 is a cross-sectional view taken along the line 4—4 of Fig. 3; and

Fig. 5 is an end view of the shaping drum showing the control means.

Figure 1:
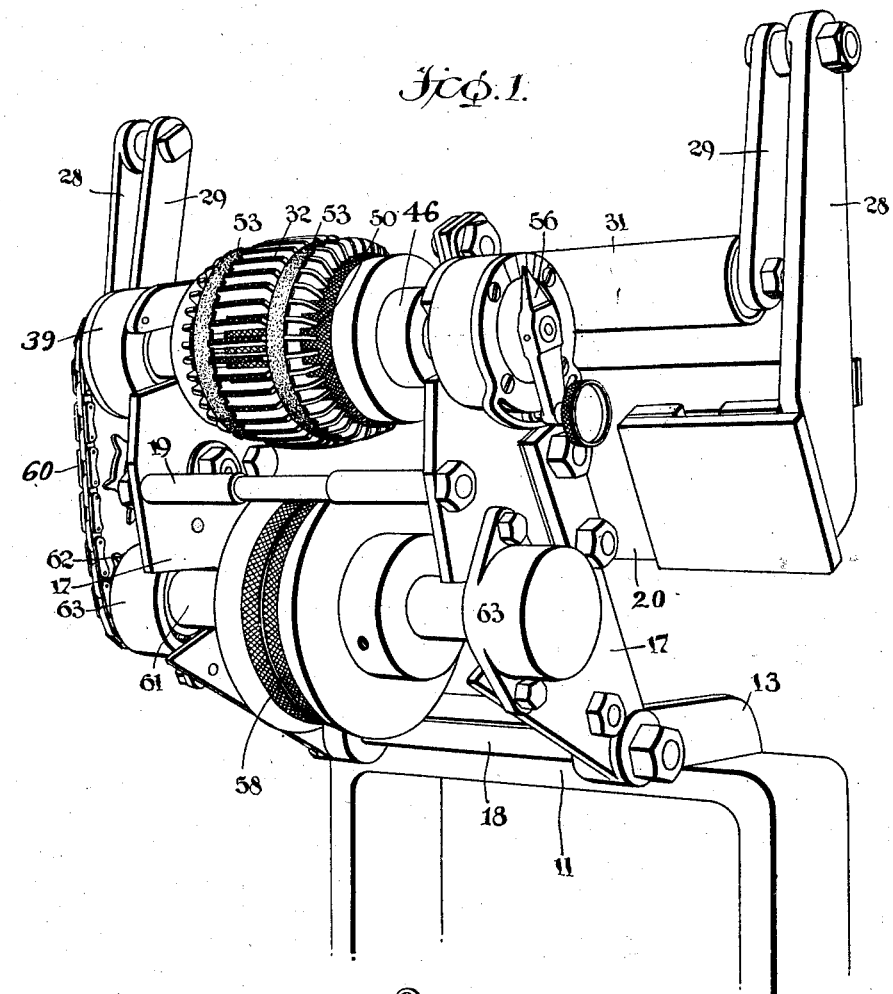
Fig. 1 is a perspective view of a device constructed according to the principles of my invention.
Figure 2:
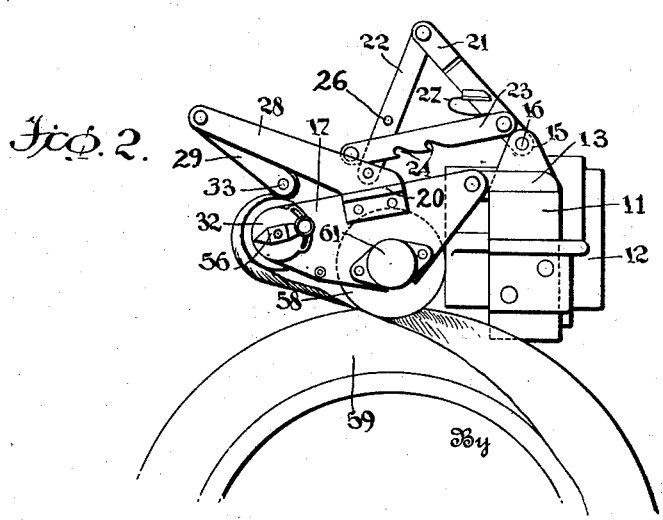
Fig. 2 is a side view, on a somewhat smaller scale, which illustrates the relation of the device to a tire building machine.

The device may be mounted in any convenient manner on or near the tire building machine. According to the embodiment illustrated in the drawings, it is positioned upon a U-shaped bracket 11 which is secured to a frame 12 mounted in a conventional manner (not shown) on a tire building machine. A pair of lugs 13 is provided on the bracket 11, upon which is rotatably mounted a pair of end members 17 which are maintained in parallel alignment by a supporting axle 18 and a strut 19, and to which the shaping device is attached. The device may be held in any convenient or desired position by means of a set of pivotally joined links 21 and 22, the first of which has an end portion 15 pivotally connected to the member 11 by means of a pin 16, and the latter of which is pivotally connected to a pair of parallel arms 28 that are attached to a cross bar 20. Relative pivotal movement of the links is controlled by a locking bar 23 pivotally joined to the link 21 and provided with notches 24 that engage a pin 26 mounted upon the link 22. The locking bar is normally urged into engagement with the pin by a U-shaped spring 27 which is fastened to the link 21, although in Figure 2 it is shown in an inoperative position.

The parallel arms 28 pivotally support a pair of links 29, the outer extremities of which constitue bearings for a roller 31 that engages a shaping drum 32. The roller 31 includes a central shaft 33 fitted at its mid-portion with a bronze bushing 34 upon which knurled sleeves 35 and a plurality of frusto-conical sleeves 36 are secured by means of cylindrical nuts 37. Elongate collars 38 are disposed to enclose the nuts 37 and the projecting end portions of the shaft.

A pair of axially aligned bearings 39 are mounted upon the end members 17 and rotatably support the shaping drum 32. The drum embodies a stationary shaft 41, having an eccentrically machined cam portion 40 which is provided with relatively smaller shouldered end portions 42. The shaft is enclosed by a rotatable sleeve-like member 43 which, for convenience of construction, is composed of a plurality of sections. These sections comprise shouldered end portions 46 that rotate upon bearings 44 upon the shaft 41 and within the bearings 39 upon members 17. An enlarged portion 47 of the sleeve which is secured upon the shouldered portions 46 encloses the eccentric central portions of the shafts 41 and 42. The intermediate portion of the member 47 is formed of spaced, knurled segments 50 that define slots. As will be noted, ball bearing races 48 are held in position upon the eccentric portions of the shaft 41 by nuts 49 and engage a plurality of plates 52 having knurled outer edges, which are disposed in the slots between members 50. The plates are retained in position by elastic bands 53 that surround the drum. A pointer arm 56 is keyed to the stationary shaft 41 and may be operated to vary the position of the eccentric portion 40, the settings being indicated on a suitable graduated segment 51 upon one of the bearings 39. The sleeve is driven by means of a sprocket wheel 57 which is keyed to one of the end portions 46 and about which is trained a sprocket chain 60 which is also trained about a second sprocket wheel 62 upon a shaft 61. The latter is journaled in bearings in the members 17 in parallel relation with respect to the shaft 41 and supports a stitcher roller 58, having a knurled periphery so shaped as to correspond to the contour of a tire core 59 of a tire building machine.

It will thus be apparent that the plates 52 adjacent the roller 31 will contact continuously with the outer race rings upon rotation of the drum and will be progressively extended beyond the circumferential surface of the drum as the outer race rings are actuated about the eccentric portions 42. When the plates approach the surfaces of the eccentric portions nearest the axis of the shaft 41, they will be retracted by means of the elastic bands 53.

In assembling the parts of the shaping device, the eccentrically formed shaft 41 is first fitted with the inner set of bearing races 48 which are secured by the nuts 49, after which the small set of bearings 44 are positioned within the portions 46 and against the shoulders provided therefor. The sleeve 43 is then secured upon the shaft and mounted within the outer bearings 39. Finally the sprocket wheel 57 is keyed to the rotatable portion of the drum and the pointer is secured to the stationary shaft. It should be noted that while the shaft 41 is normally stationary, it is not to be concluded that it is rigidly mounted inasmuch as it is rotatably adjustable, but remains stationary during the operation of the device.

In practicing my invention, the device is swung into operative relation to the core 59 after which the unit supported by the end members 17 is raised slightly, in order to free the cross link 23 from the pin 26. The stitching roller is then lowered and permitted to rest upon the core of the tire building machine. The fabric passes over the engaging roller 31 around the drum 32 and under the stitching roll 58, in the manner illustrated in Fig. 2. By causing the core to rotate, the stitching roller will drive the shaping drum through its chain-sprocket connection. The fabric engages the drum at a point where the plates or elements 52 have an apparent radius which is a minimum. But, as the drum is caused to rotate with the fabric, the elements move outwardly by a positive drive, forcing the fabric with them. The strain produced will thus be progressively increased as the fabric travels with the drum and may be varied by changing the position of the eccentric. So, for example, if the fabric engages the drum through 180° and it is desired that a strain be produced which is less than the radial throw of the elements, the eccentric may be moved so that the fabric comes in contact with them before they have reached their lowest point.

Obviously the shape of the engaging elements 52 may be varied, if so desired. Also the amount of throw of the eccentric may be varied. Nor is it to be concluded that inasmuch as the application of the principles of the invention have been directed to the tire art they are limited to such application, inasmuch as the device may be employed wherever any stretching or shaping operation is desired.

Thus, while I have shown and specifically described the application of the principles of my invention to only a single embodiment, it will be appreciated by those skilled in the art that they may be subjected to many modifications without departing from their scope and I desire, therefore, that they be limited only in accordance with prior art and the appended claims.

What I claim is:

1. A shaping device comprising a shaft formed with an eccentric portion and a plurality of resiliently contained means actuated by the eccentric portion and adapted for radial movement.

2. A fabric shaping device comprising a shaft formed with an eccentric portion, a plurality of resiliently contained engaging elements and means for causing relative rotary movement between the shaft and the elements, thereby progressively actuating said elements in a radial direction.

3. A fabric shaping device having a plurality of engaging elements adapted to be actuated radially in progressive order, means for bringing the fabric into engagement with said elements and means for controlling the extent of radial movement of the elements while the fabric is in engagement therewith.

4. A device for shaping rubberized fabric comprising means for bringing the material into frictional contact with a plurality of elements motivated about and in engagement with a cam.

5. A device for shaping rubberized fabric comprising a shaft formed with an eccentric portion, a set of bearings mounted thereon, a plurality of elements motivated about the eccentric portion in engagement with the bearings and means for bringing the elements progressively into frictional engagement with the material.

6. A device for shaping rubberized fabric material comprising a shaft formed with an eccentric portion, a set of bearings mounted thereon, a plurality of elements motivated about the eccentric in engagement with the bearings, and a roller adapted to insure frictional contact between the fabric and the elements.

7. In a core type machine for building pneumatic tires, a device for shaping rubberized fabric comprising an adjustable eccentric having a set of bearings mounted thereon, a plurality of elements motivated about the eccentric and in engagement with the bearings, a roller adapted to insure frictional contact between the fabric and the elements and a stitching tool for applying the shaped fabric to the core.

8. A fabric shaping device comprising a shaft including an eccentric portion having a set of ball-bearings mounted thereon, and a plurality of plate members maintained in parallel alignment about the eccentric by a slotted hub which surrounds the shaft and is adapted to rotate thereabout.

9. A fabric shaping device comprising an adjustable eccentric shaft having a set of roller bearings mounted thereon, and a housing enclosing said shaft and in rotatable relation therewith adapted to motivate a plurality of plate members about the eccentric, said members being resiliently maintained in engagement with the bearings.

10. A fabric shaping device for tire building machines comprising an adjustable eccentric having a housing in rotatable relation therewith adapted to motivate a plurality of fabric engaging elements about the eccentric, an elastic member adapted to retain the elements in engaged relation with the eccentric and a stitching roll to apply the shaped fabric to the core of a tire building machine.

11. A fabric shaping device comprising a rotatable drum including a plurality of outwardly movable radially disposed segments adapted to contact with a stationary eccentric disposed within the drum.

12. A fabric shaping device for tire building machines comprising a rotatable drum including a plurality of outwardly movable radially disposed segments mounted to contact with an adjustable normally stationary eccentric.

13. A fabric shaping device for tire building machines comprising a stationary shaft having an eccentric formed thereon, a plurality of outwardly movable radially disposed plates adapted to rotate around and to contact with the eccentric and having their outer edges of longitudinally arcuate shape.

14. A fabric shaping device for tire building machines comprising a shaft, an eccentric formed on the shaft, a plurality of radially movable segments having longitudinally arcuate outer edges disposed about and in contact with the eccentric and rotatably mounted with respect thereto and a roller adapted to engage the segments having its middle portion of concave contour to correspond to the arcuate outer faces of the segments.

15. A machine for shaping elongate strips of extensible material comprising a shaft, a cam secured to the shaft, a sleeve rotatable upon the shaft and having slots formed longitudinally therein, radially slidable plates disposed in the slots, means for resiliently urging the plates into contact with the cam, and means for adjusting the position of the shaft about its longitudinal axis.

16. A machine for shaping elongate strips of extensible material comprising a shaft having a cam portion thereon, a sleeve rotatably secured upon the shaft and having slots extending longitudinally therein, radially movable plates disposed in the slots, means urging the plates into contact with the cam portion, means for rotating the sleeve upon the shaft, and means for maintaining the shaft in various positions of adjustment about its longitudinal axis.

17. In a tire building machine, a rotatable core, a stitcher roller contacting with the core, a shaping device associated with the stitcher roller comprising a series of segments disposed in axial arrangement about a shaft, means for successively moving the segments in a radial direction while they are passing through a given arc during their rotation about the shaft, and driving means interconnecting the roller and the segments for imparting rotational movement to the latter.

18. A machine for building pneumatic tires comprising a rotatable tire core, a stitcher roller contacting therewith, a shaping device associated with the stitcher roller including a series of radially arranged segments rotatable about a common axis, a stationary cam contacting with the inner edges of the segments, driving means interconnecting the stitcher roller and the segments for imparting rotational movement to the latter about the common axis, and a nip roller coacting with the outer edges of the segments for pressing strips of extensible material thereagainst.

19. In a device for shaping strips of sheet material, a shaft having means for holding it in various positions of adjustment about its longitudinal axis, said shaft having an eccentric formed thereon, a longitudinally slotted drum rotatably mounted on the shaft and enclosing the eccentric portion extension elements slidably mounted in the slots and means for maintaining the elements in contact with the eccentric.

In witness whereof, I have hereunto signed my name.

ELOV F. MAAS.